United States Patent Office 3,505,872
Patented Apr. 14, 1970

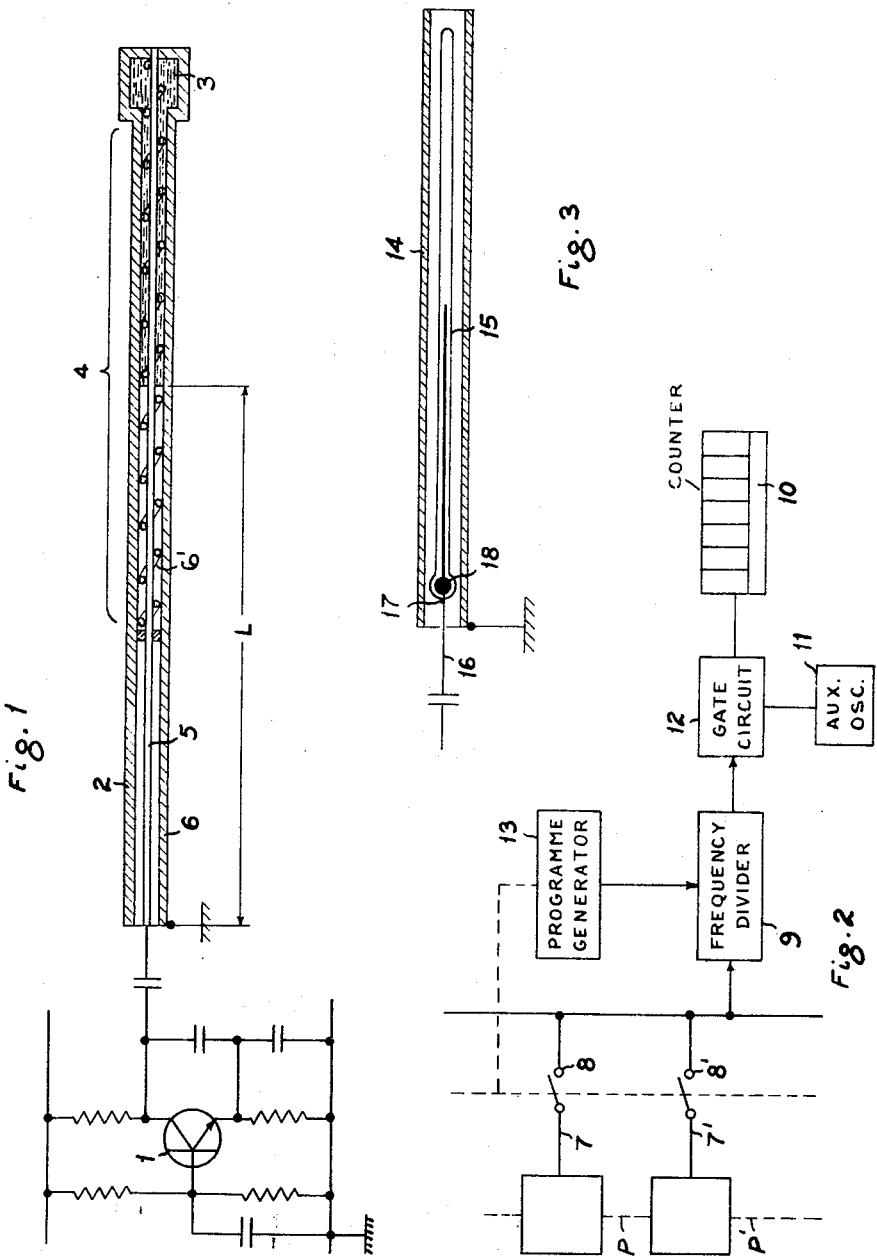

3,505,872
APPARATUS FOR MEASURING TEMPERATURE WITH DIGITAL READOUT
René Marolf, Baden, Switzerland, assignor to Aktiengesellschaft Brown, Boveri & Cie, Baden, Switzerland, a joint-stock company
Filed Apr. 5, 1968, Ser. No. 718,996
Claims priority, application Switzerland, July 14, 1967, 10,116/67
Int. Cl. G01k 5/18
U.S. Cl. 73—368          10 Claims

ABSTRACT OF THE DISCLOSURE

A device for effecting a digital readout of a measurement of temperature employs a thermometer the liquid capillary column of which varies the length of a quarter-wave co-axial line of which the thermometer forms a part. The variable length of the line is coupled to and serves to effect a corresponding change in the output frequency of a variable frequency oscillator, and this variation in frequency output is utilized to actuate a digital counter up or down in accordance with the sense of the change in frequency.

---

This invention relates to a device for a digital readout of temperature-measurement with a measuring oscillator whereof the temperature-dependent frequency depends on the length of an electrically conductive liquid column in the capillary of a liquid thermometer.

Devices of this type have the advantage that the output signal of the measuring oscillator is available as a temperature-dependent quantity capable of direct digital evaluation. In the case of a known device of this type, the mercury column of a measuring thermometer forms one plate of a condenser in the oscillatory circuit of the measuring oscillator. Any change in temperature thus alters the condenser capacity and accordingly the oscillator frequency. However, this known device has the disadvantage that the cycle time of the oscillator frequency does not change linearly with temperature in accordance with the change in capacity of the condenser, which makes digital evaluation of the temperature difficult.

In the case of another known device, a contact-thermometer is provided with a plurality of contacts, each joined to a corresponding tapping on an oscillatory coil of a measuring oscillator. The mercury column short-circuits more or fewer portions of the oscillatory coil in any particular case, and thus changes the oscillator frequency in steps in dependence on temperature. A suitable choice of tappings can make the duration of a cycle at oscillator frequency vary in steps which are linear with temperature.

However, this device does not enable continuous temperature-measurement to be carried out, and furthermore requires relatively expensive construction.

The principal object of the invention is to provide a device for a digital temperature-measurement readout wherein the duration of a cycle at measuring-oscillator frequency depends continuously, with great accuracy and in linear fashion on temperature, and which furthermore makes possible a simple, noise-insensitive embodiment and economical grouping of a large number of temperature points in one plant.

The device according to the invention is characterized in that the frequency-determining member of the measuring oscillator is a co-axial line which acts as a quarter-wave line at oscillator frequency, and whereof the electrical length is determined by the length of the liquid column in the thermometer capillary.

The foregoing objects and advantages inherent in the invention will become more apparent from the following detailed description of preferred embodiments and from the accompanying drawings wherein:

FIG. 1 is a combined structural section and electrical schematic view of one embodiment omitting however, some of the electrical components associated with the digital readout;

FIG. 2 is a block schematic electrical diagram illustrating the manner in which a plurality of temperature sensing elements can be coupled up to a digital readout by means of a programme generator; and FIG. 3 is a view in central longitudinal section of a modified temperature sensing element.

With reference now to FIG. 1, a transistor 1 in a Colpitts oscillator circuit serves as the measuring oscillator, and has a frequency-determining member in the form of a co-axial line 2 connected to its collector-base path. The temperature-sensor takes the form of a liquid thermometer made up of a thermometer-bulb 3 and the portion 4 of the co-axial line 2, which portion acts as the thermometer capillary, the electrically conductive thermometer liquid short-circuiting the co-axial line 2 at its end over part of its length in any particular case. For the thermometer liquid, mercury is used as is customary, or a mercury-thallium alloy in order to increase the range of temperature-measurement.

The inner conductor of the portion 4 of the co-axial line 2 acting as the thermometer capillary consists of a metal wire 5, centered in a metal cylinder 6 by means of a helically formed winding 6' of synthetic resin material, the metal cylinder 6 acting as the outer conductor of the co-axial line.

The part of the co-axial line of length L, which is free of thermometer liquid, constitutes a quarter-wave line short-circuited at the output, and acts as a frequency-determining member which excites oscillation whereof the duration T of a cycle is a linear function of this length L, i.e.

$$T = T_0 + K_0 L$$

$T_0$ and $K_0$ representing constants.

Since this length L depends in turn on the measured temperature value $\vartheta$ the duration T of a cycle may also be expressed as a linear function of $\vartheta$ by $$T = T_1 - K_1$$

A circuit according to FIGURE 2 serves for digital indication and recording purposes. In the illustrated example, it is designed for a plurality of temperature-measurement points.

Each of the temperature-measurement points P, P' comprises a temperature-sensor with a measuring oscillator according to FIGURE 1. The output signals of the measuring oscillators Osc1 and Osc2 are fed sequentially in accordance with a definite programme via the lines 7, 7' and the switches 8, 8' to the input of a frequency-divider 9 which reduces the signal frequencies of the measuring oscillators in each case by a fixed factor, for example by $10^{-5}$. At the output of the divider 9 there is delivered a pulse sequence whereof the duration T' of a cycle is greater by the same factor, thus, for example, by $10^5$, than the cycle T of the measuring-oscillator signal. This "transformed" duration T' of a cycle is now likewise a linear function.

$$T' = T_1' - K_1'$$

of the measured temperature value $\vartheta$.

In order to determine the measured temperature value $\vartheta$ digitally, there is a result counter 10 into which an auxiliary oscillator 11 counts counting pulses at a suitable constant frequency during an interval of the length of the transformed duration T' of a cycle via a gate circuit 12. The gate circuit 12 is controlled by the output signal of the divider 9 in such a manner that after a suitable tripping signal has been received from a programme-generator 13 the first following negative flank of the divider output signal opens the gate circuit, while the next following negative flank closes the gate circuit again. Each time before the counting operation is tripped, the result-counter 10, which is designed to count forwards and backwards, is set to that state of counting from which the state of 0, corresponding to $\mathsf{s}-=0$, is reached when counting takes place backwards for a transformed duration $T'=T_1'$ of a cycle.

The result-counter 10 is connected up so that it first counts backwards towards 0 from this set value of counting, and thereafter if appropriate counts further in the forward direction. According to whether or not the state of 0 has been reached in the course of counting, the result-counter 10 indicates states of counting proportional to the positive or negative measured temperature value. Suitable choice of the auxiliary oscillator frequency and of the reduction factor ensures that the measured temperature value is correctly indicated in amount and sign in the result-counter with the desired resolution, for example 1 counting pulse per 0.1° C.

A further possible example of embodiment of the temperature-sensor is illustrated in FIGURE 3. The outer conductor of the co-axial line acting as a temperature-sensor consists, in a manner similar to the case of the variant according to FIGURE 1, of a metal cylinder 14, while the inner conductor takes the form of the mercury column of a thermometer 15 arranged centrally in the outer conductor, which column is electrically connected to the input 16 via a contact 17 fused into the thermometer-bulb 18. This arrangement constitutes a coaxial line open at the output which acts as a half-wave line forming the member determining the frequency of the measuring oscillator. In this case, the measuring oscillator works at lower frequencies in the case of relatively high measured temperatures than in the case of relatively low temperatures, as opposed to the variant according to FIGURE 1. The linear relationship between the duration T of a cycle and measured temperature is thus opposite to that of the variant according to FIGURE 1, which is taken into account when evaluating with the aid of a circuit according to FIGURE 2 by a correspondingly changed interpretation of the states of values counted by the result-counter.

I claim:

1. In a device for effecting a readout in a digital counter of a measurement of temperature wherein a change in temperature produces a corresponding change in the output frequency of an electrical oscillator which effects a corresponding change in said digital counter, the improvement wherein the frequency determining member is constituted by a co-axial line which functions as a quarter-wave line at oscillator frequency, and wherein a liquid thermometer is provided the capillary of which constitutes a portion of the cavity of said co-axial line and said cavity is short-circuited at its output over part of its length by the liquid column of the thermometer.

2. A temperature measuring device as defined in claim 1 wherein said coaxial line is constituted by a hollow conductive cylinder serving as the outer conductor of the line and a conductive wire centered within said cylinder which serves as the inner conductor of the line, the annular space between said hollow cylinder and wire being filled in part with the thermometer liquid, and there being an electrical connection from said wire to the circuit of said frequency variable oscillator.

3. A temperature measuring device as defined in claim 1 wherein mercury or a mercury alloy is used for the liquid in said thermometer.

4. A temperature measuring device as defined in claim 1 which includes a frequency divider connected to the output of said frequency variable oscillator, and wherein said digital counter is supplied from an auxiliary oscillator having a constant frequency output by way of a gate circuit, said frequency divider supplying an opening pulse to said gate circuit during an interval in which said frequency varable oscillator delivers a predetermined number of pulses to said counter.

5. A temperature measuring device as defined in claim 1 and which includes a plurality of frequency variable oscillators coupled to individual thermometers, a programme generator and switching means controlled from said programme generator and interposed in circuit means connecting the outputs of said oscillators in sequence to a digital counter common to said oscillators.

6. In a device for effecting a readout in a digital counter of a measurement of temperature wherein a change in temperature produces a corresponding change in the output frequency of an electrical oscillator which effects a corresponding change in said digital counter, the improvement wherein the frequency determining member is constituted by a co-axial line which functions as a half-wave line at oscillator frequency, and wherein a bulb type thermometer is provided, the liquid column of the capillary of said thermometer constituting the inner conductor of an open-output co-axial line and being connected electrically to the input of the co-axial line by way of the thermometer bulb.

7. A temperature measuring device as defined in claim 6 wherein said co-axial line is constituted by a hollow conductive cylinder serving as the outer conductor of the line and said thermometer includes a rectilinear column of liquid within a glass tube centered within said conductive cylinder which serves as the inner conductor of the line, there being an electrical connection from the liquid in bulb portion of said thermometer to the circuit of said frequency variable oscillator.

8. A temperature measuring device as defined in claim 6 wherein mercury or a mercury alloy is used for the liquid in said thermometer.

9. A temperature measuring device as defined in claim 6 which includes a frequency divider connected to the output of said frequency variable oscillator, and wherein said digital counter is supplied from an auxiliary oscillator having a constant frequency output by way of a gate circuit, said frequency divider supplying an opening pulse to said gate circuit during an interval in which said frequency variable oscillator delivers a predetermined number of pulses to said counter.

10. A temperature measuring device as defined in claim 6 and which includes a plurality of frequency variable oscillators coupled to individual thermometers, and a programme generator and switching means controlled from said programme generator and interposed in circuit means connecting the outputs of said oscillators in sequence to a digital counter common to said oscillators.

References Cited

UNITED STATES PATENTS

| 3,190,122 | 6/1965 | Edwards | 73—371 |
|---|---|---|---|
| 2,300,315 | 10/1942 | Puhlmann | 331—101 |

LOUIS R. PRINCE, Primary Examiner

D. E. CORR, Assistant Examiner

U.S. Cl. X.R.

331—101